Feb. 10, 1931.　　　W. F. PETERSEN　　　1,792,465
STEAM GENERATOR FOR OVENS
Filed Oct. 4, 1930
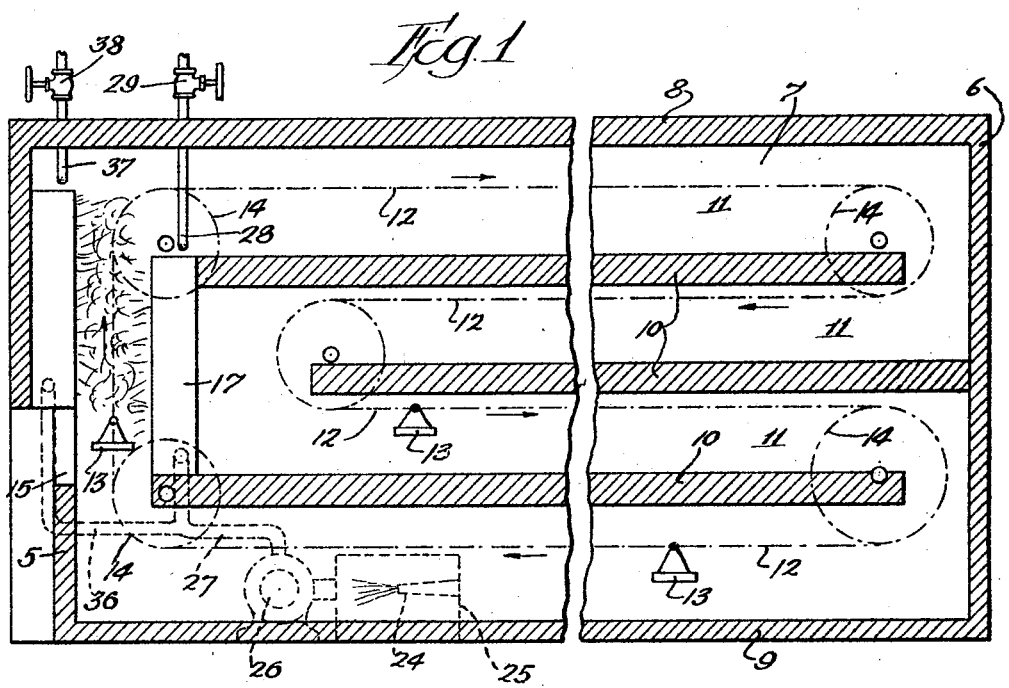
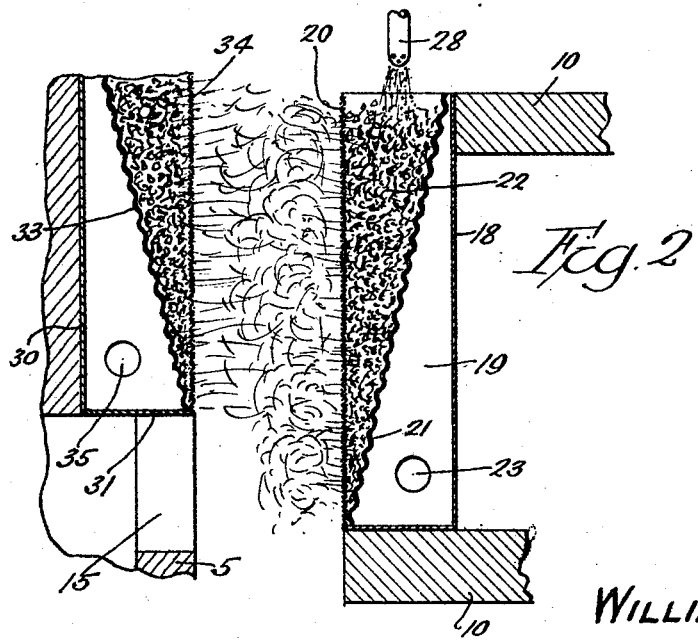
Inventor:
WILLIAM F. PETERSEN Patented Feb. 10, 1931

1,792,465

UNITED STATES PATENT OFFICE

WILLIAM F. PETERSEN, OF CHICAGO, ILLINOIS, ASSIGNOR TO THE PETERSEN OVEN COMPANY, OF CHICAGO, ILLINOIS, A CORPORATION OF ILLINOIS

STEAM GENERATOR FOR OVENS

Application filed October 4, 1930. Serial No. 486,371.

My invention relates to bake ovens and has more particular reference to means for generating steam or moist vapor within the oven for the purpose of treating the loaves of dough therein. More specifically the structure I have devised is adapted to be used in connection with a traveler tray oven in which there are a plurality of baking chambers or passes through which a continuous conveyor moves the shelves or trays containing the goods.

It is desirable, and it is the practice in bakery technique, to initially subject the loaves of dough to moist hot vapor, such as steam, during the first run of the traveler for conditioning the dough and thereafter to subject the goods to a dry heat for the purpose of baking. Pipes have been utilized to discharge steam into the chamber or compartment in which the dough is conditioned. I have, however, devised a scheme whereby the steam is actually generated upon the inside of the oven discharged direct into the conditioning chamber. In order to do this I have provided a casing containing metalliferous material, such as iron filings or the like, which are heated by hot air that is driven into the casing and the steam is created by devices which moisten the hot filings so that the vapor created may be discharged through an apertured wall of the casing into the conditioning chamber of the oven.

In devising this structure it is one of my objects to provide an apparatus that is simple and novel in construction, which is dependable in operation, which is effective in performing its functions, and which has practically no parts to get out of order. Further objects will be apparent to others after an understanding of my invention is had from the following detailed description.

I prefer to carry out my invention and to accomplish the numerous objects thereof in substantially the manner hereinafter fully described and as more particularly pointed out in the claims. Reference will now be made to the accompanying drawings, in which:—

Figure 1 is a vertical longitudinal section of a typical bake oven of the traveler type showing my steam generator installed therein.

Figure 2 is a vertical sectional view showing the details of the steam generator.

The drawings are to be understood as being more or less schematic for the purpose of illustrating a typical or preferred form in which my invention may be made, and in said drawings similar reference characters have been employed to designate like parts wherever they appear throughout the several views.

Referring first to Figure 1 the oven comprises an elongated housing consisting of vertical front and rear walls 5 and 6, longitudinal side walls 7 connecting said vertical walls, a top wall or ceiling 8 and a base 9 from which the vertical walls arise. Horizontally disposed partitions 10, which extend from the front portion to the rear portion of the oven, divide the interior thereof into a plurality of chambers or passes 11 that communicate with each other at their ends and through which the conveyor or link belt 12 carries the trays or shelves 13 through the medium of sprockets or the like 14.

The front wall 5 of the oven is provided with an opening 15 through which access is had to the trays for feeding and unloading the same, and immediately back of this front wall the conveyor or link-belts with the trays travel in a vertical direction upwardly to the top of the oven. A vertical compartment 16 extends across the oven back of the front wall providing a conditioning chamber in which the goods are subjected to the action of steam or moisture, and compartment 16 communicates at its top and bottom with the respective upper and lower compartments 11 of the oven.

The front wall 5 of the oven provides the front wall of the compartment 16 and my improved steam generator, designated as a unit by the numeral 17, provides the rear wall of the vertical compartment 16. While the trays are traveling through the several compartments 11 the goods are subjected to heat for baking that is created through the medium of any instrumentality that may be desired or adapted for the particular type of goods being baked. The manner of heating the compartments is omitted from the drawings because of the fact that a variety of devices may be employed, depending upon the type of the oven and the character of the goods being baked.

The steam generator which I have devised is in the form of an elongated vertical casing open at its top, that extends from side to side of the interior of the oven and consists of a vertical back wall 18, vertically disposed end walls 19 and an apertured front wall 20. The apertured wall may be a metal plate in which a plurality of openings are made or it may be a reticulated or woven wire fabric such as shown in Figure 2. A partition 21 extends in an inclined direction from the lower front corner adjacent the apertured wall 20 upwardly towards the rear and it is preferably a sheet of corrugated metal as shown in Figure 2 in order to increase the heating surface thereof.

The inclined wall 21 extends from end to end of the casing and divides the interior thereof into side by side compartments of V-shape in cross-section. The compartment between the inclined wall 21 and the apertured front wall 20 is filled with metalliferous material 22 such as iron-filings or the like and the openings in the apertured wall should be smaller in dimensions than the smallest piece of metalliferous material in said compartment. The compartment back of the compartment just described may be designated as the heat compartment and it tapers upwardly in the manner shown and hot air is supplied thereto through the opening 23 in one end thereof. Upon the outside of the oven wall is a flame nozzle 24, using gas, oil or other fuel, that is enclosed within a housing 25 and the hot air therefrom is blown by a fan or blower 24 through a pipe 27 to the opening 23 in the end of the steam generator casing.

The hot air is of a high temperature and necessarily increases the temperature of the inclined corrugated partition 21, which in turn conducts the heat to the iron filings in the front compartment. These iron filings become very hot, so much so that when moistened they will generate steam. I have therefore provided a drip-nozzle 28 immediately above the open top of the casing and close to the iron filing. This nozzle is at the end of a pipe leading from a source of fluid supply and is controlled by a valve 29. After the filings have become highly heated the fluid is allowed to drip from the nozzle 28 upon the filings and it is converted into steam which passes out through the apertured wall 20 into the conditioning chamber 16 through which the goods are traveling in an upward direction.

This subjects the dough to the conditioning action of the steam and the steam is being continuously generated so long as the iron filings are kept at a high temperature and moistened with the fluid. The fluid used may be water from a service pipe, or it may be a treated liquid that causes a chemical reaction when converted into steam for the purpose of carrying a suitable gas to the goods.

The front-wall 5, above the opening 15 through which access is had to the shelves or trays, preferably, is also in the form of a steam-generator that is adapted to discharge the steam or hot vapor into the chamber 16 of the oven. This front-wall generator faces the other generator 17 and discharges the steam or hot vapor in a direction opposite to that of the first described structure.

The front-wall generator comprises an imperforate wall 30 that is disposed outermost with respect to the oven housing and may form a part of the vertical front wall 5 of the oven above the access opening 15. There is also a bottom wall 31 extending inwardly to the vertical plane of the inner surface of the front wall 5, and there are also vertically disposed end walls 32. A corrugated partition 33 extends from end to end of the chamber formed by the aforesaid walls and inclines from the inner edge of the bottom wall 31 upwardly and outwardly toward the front of the casing, the inclination of this corrugated wall 33 being opposite to that of the corrugated wall 21 of the other steam generator. An apertured wall 34 is disposed vertically along the inner portion of the generator in the manner similar to the wall 20 of the opposing structure and may be a reticulated or woven wire fabric or may be a perforated metal sheet.

This structure provides two side by side V-shaped chambers having converging or tapered front and rear walls. The chamber between the corrugated wall 33 and the apertured wall 34 is filled with metal filings or the like in the same manner as before described. The heat compartment, which is outermost between the corrugated wall 33 and the outer wall 30, receives its heat through an opening 35 in its lower portion that is connected to a conduit or flue 36 leading from the pipe 27 that feeds the hot air to the other generator.

A drip nozzle 37 is disposed above the compartment containing the metal filings and the fluid discharging therefrom is controlled by a valve 38 upon the outside of the oven housing. The operation of the structure just described is similar to that hereinbefore explained and the steam or hot vapor generated in the last described structure discharges into the chamber 16 of the oven in a direction opposed to that of the first mentioned generator. In the operation of these side by side spaced generators it is possible to very nicely control the humidity within the chamber or pass 16 by opening or closing the valves 29 and 38 to increase or reduce the amount of fluid moisture fed to the heated filings.

It is obvious that either of the generators may be dispensed with and the oven successfully operated in the manner desired. It is also obvious that different means may be employed for heating the iron filings than those herein shown. Also other materials and means may be employed for receiving the liquid or water that is converted into steam or gas. The drawings and detailed description herein are given for the purpose of clearness of understanding only and no unnecessary limitations are to be understood therefrom, but the claims are to be construed as broadly as permissible in view of the prior art.

What I claim is:—

1. A bake oven comprising a housing, partitions therein providing a plurality of compartments, a vapor-chamber connecting two of said compartments, and a vapor-generator adjacent said chamber consisting of a casing, an apertured wall on the side of the casing next said vapor-chamber, a mass of metal filings within said casing, means for heating said mass to a high temperature, and means for feeding fluid to the hot mass whereby vapor is generated and discharged through the apertured wall into said vapor chamber.

2. A bake oven comprising a housing, partitions therein providing a plurality of compartments, a vapor-chamber connecting two of said compartments, an endless conveyor traversing said compartments and said vapor-chamber, shelves carried by said conveyor, and a vapor-generator adjacent said chamber consisting of a casing, an apertured wall on the side of the casing next said vapor-chamber, a mass of metal filings within said casing, means for heating said mass to a high temperature, and means for feeding fluid to the hot mass whereby vapor is generated and discharged through the apertured wall into said vapor chamber.

3. A bake oven comprising a housing having a plurality of compartments, and a vapor-generator adjacent one of said compartments consisting of a casing having an apertured wall next said adjacent compartment, a mass of metal filings in said casing, and means for heating and moistening the mass to cause the same to emit vapor that is discharged through the apertured wall of the casing into said adjacent compartment.

4. In a bake oven a humidity chamber through which the goods travel, an elongated casing extending along a side of said chamber and having an apertured wall opening adjacent the same, a longitudinal partition dividing the interior of the casing into contiguous compartments, a metalliferous mass in one of said compartments, means for heating the other compartment to raise the temperature of the mass, and means for moistening the hot mass to create moist vapor that discharges into said chamber through the apertured wall of the casing.

5. In a bake oven a humidity chamber through which the goods travel, an elongated casing extending along a side of said chamber and having an apertured wall adjacent the same, an inclined partition extending upwardly from the lower portion of the casing towards the rear thereof providing a receptacle and a compartment, metalliferous material in said receptacle, means for heating said compartment to raise the temperature of the material in said receptacle, and means for moistening the heated material to create vapor that discharges through said apertured wall into said chamber.

6. A steam generator for bake ovens comprising a casing extending along one of the chambers of the oven, a reticulated wall that separates the casing from the chamber, an inclined partition extending from the lower front portion of the casing upwardly towards the rear thereof, metal filings in the space between the reticulated and inclined walls, a drip nozzle for supplying a fluid to said filings, and means for heating the portion of the casing back of the inclined wall.

7. A bake oven comprising a housing having a plurality of compartments and an upwardly extending pass connecting two of said compartments, and devices for generating and discharging steam into said pass, said devices consisting of chambers on each side of said pass having apertured walls next the pass through which vapor is discharged, a metalliferous mass back of each wall, means for heating each mass, and means for moistening each hot mass.

8. A bake oven comprising a housing having a plurality of compartments and an upwardly extending pass connecting two of said compartments, and devices for generating and discharging steam into said pass, said devices consisting of a casing on each side of said pass, a partition in each casing dividing them into adjacent generator chambers, the facing walls of said chambers being apertured, and the walls of the remaining portions of the casings being imperforate to provide heating chambers next the respective generator chambers, metalliferous masses in the generator chambers, means for moistening said masses, and means for heating the heating chambers.

Signed at Chicago, in the county of Cook and State of Illinois, this 19th day of September, 1930.

WILLIAM F. PETERSEN.